United States Patent [19]

Hanson

[11] Patent Number: 4,518,371
[45] Date of Patent: May 21, 1985

[54] POWER TOOL DRIVE ATTACHMENT

[76] Inventor: David K. Hanson, 861 Glenhaven Dr., La Habra, Calif. 90631

[21] Appl. No.: 531,039

[22] Filed: Sep. 12, 1983

[51] Int. Cl.³ .............................................. F16H 7/14
[52] U.S. Cl. ................................................... 474/114
[58] Field of Search ..................... 474/114, 78, 88, 89, 474/150

[56] References Cited

U.S. PATENT DOCUMENTS

3,354,736  11/1967  Simi .................................. 474/114

Primary Examiner—James A. Leppink
Assistant Examiner—Frank H. McKenzie, Jr.
Attorney, Agent, or Firm—Georges A. Maxwell

[57] ABSTRACT

A belt drive attachment for motor driven machines comprising a vertical frame with top and bottom ends, spaced front and rear ends and spaced sides, a substantially flat mounting wall at the upper forward portion of the frame to engage and be fastened to a motor mounting pad on a related machine, bearing means within the frame, an elongate countershaft rotatably carried by the bearing means and having a portion projecting from the frame and a portion within the frame, a mounting plate at the lower rear portion of the frame to releasably cooperatively engage a motor mounting frame of a related motor, hinge means pivotally connect the plate to the frame for pivotal movement of said plate and a related motor relative thereto, clamp means engaged with and between the frame and the plate and releasably hold the plate in fixed pivotal position, a multi-diameter/multi-sheave input pulley wheel is drivingly engaged on the portion of the shaft within the frame, a drive belt is engaged about and between the input pulley wheel and a complimentary multi-diameter/multi-sheave pulley wheel on the drive shaft of a related motor mounted on the plate and a multi-diameter/multi-sheave output pulley wheel is drivingly engaged on the portion of the countershaft projecting from the frame and is engageable with a drive belt engaged with and extending from a multi-diameter/multi-sheave driven pulley wheel on a driven shaft on a related machine spaced from the output pulley wheel.

16 Claims, 16 Drawing Figures

POWER TOOL DRIVE ATTACHMENT

This invention has to do with a novel power tool drive attachment.

BACKGROUND OF THE INVENTION

The art of power tools and/or machines provides many different makes and models of power driven drill presses, lathes, saws, mills and the like for performing work on various materials. The prime movers in a large percentage of such machines are constant speed electric motors and the motors are drivingly connected with power driven shafts of the related machines by pulley and belt drive means which enable the operators of the machines to adjust the speed at which the input shafts of the machines are driven. The pulley and belt drive means typically include pairs of multi-diameter/multi-sheave pulley wheels on the motor driven shafts and driven shafts and belts engaged with and about the pulleys, whereby the driven shafts can be made to operate or to rotate at one of the limited number of predetermined operating speeds afforded by the pulley and belt drive means. If the pulley wheels of the belt and pulley drive means are three or four sheave wheels, three or four operating speeds are afforded thereby and the range of speeds is necessarily and/or generally quite limited. For example, a typical motor which operates at 1,750 RPM driving the driven shaft of a related machine through and/or by means of a three sheave multi-diameter pulley and belt drive means is capable of driving the input shaft at for example, 875 RPM, 1,750 RPM and 3,450 RPM, by shifting or moving the belt of the drive means into engagement with related pairs of sheaves of the pulley wheels.

The work that most power driven machines can perform is limited, to a great extent, by the speed at which the machines can be operated. Thus, the use to which a machine having a limited range of operating speeds can be put is limited. As a general rule, if the range of operating speeds of a machine can be increased, the uses to which that machine can be put is also increased.

Common characteristics in power driven machines of the general character referred to above resides in the fact that an excess of ninety percent of such machines are equipped and driven by NATIONAL ELECTRICAL MANUFACTURERS ASSOCIATION NO. 56 FRAME MOTORS, hereinafter referred to and/or identified as N.E.M.A. #56 Frame Motors, or Standard Motors. N.E.M.A. #56 Frame Motors are dimensionally similar and are characterized by like shaft diameter, like shaft length, like keyways, like mounting plates or frames having like fastener receiving openings. Further, the machines with which such motors are related are characteristically provided with motor mounting pads with motor mounting studs projecting therefrom or with fastener receiving openings which are complimentary with the mounting frames of the motors, to facilitate easy, convenient and accurate mounting of the motors.

In the art of power driven machines of the general character referred to above and which are here concerned with, there has been a long existing want and need for a means whereby the operating speeds of the machines can be easily, conveniently and effectively substantially decreased and substantially increased so as to extend the useful purposes to which the machines can be put.

OBJECTS AND FEATURES OF MY INVENTION

An object and feature of my invention is to provide a drive attachment for motor, belt and pulley driven machines to materially increase the number of selective operating speeds of the machines whereby the uses to which they can be put can be increased.

It is an object and feature of my invention to provide an attachment for the purpose set forth above which compounds the normal belt and pulley drive means of a related machine and multiplies the number of operating speeds thereof.

Yet another object and feature of my invention is to provide an attachment of the general character referred to having a mounting part pad which is cooperatively related with the standard mounting pad on a related machine and which has a standard motor mounting plate which is cooperatively related with the mounting frame of a related motor, whereby the attachment can be easily and conveniently engaged between and related to its related machine and motor.

Yet another object and feature of my invention is to provide an attachment of the general character referred to which is proportioned and constructed to be small and compact and which is such that when engaged between and coupled with the mounting pad and mounting frame of a related machine and motor, it supports the motor relative to the machine within the motor receiving and working space provided by the machine.

It is another object and feature of my invention to provide an attachment of the general character referred to which includes a counter shaft in spaced parallel relationship between the power drive shaft of the motor and the driven shaft of the machine, axially spaced multi-diameter input and output pulley wheels on the counter shaft, a multi-diameter pulley wheel on the motor drive shaft drivingly coupled with the input wheel by a drive belt and a multi-diameter pulley wheel on the driven shaft drivingly coupled with the output pulley wheel by a drive belt.

Another object and feature of this invention is to provide an attachment of the general character referred to in the foregoing wherein the attachment includes means for easily, quickly and conveniently loosening and tightening the belt between the motor drive shaft and counter shaft whereby that belt can be easily, quickly and conveniently moved into and out of engagement with selected pairs of sheaves on the pulley wheels with which it is related.

Finally, it is an object and feature of my invention to provide an attachment of the general character referred to which includes a small number of parts, each of which is easy and economical to make, is rugged and durable and an attachment structure which is easy, economical and convenient to assemble, install and use. The foregoing and other features of my invention will be apparent and fully understood from the following description of one typical preferred form and embodiment of the invention throughout which description, reference is made to the accompanying drawings.

DESCRIPTION OF THE INVENTION

Figure 1:
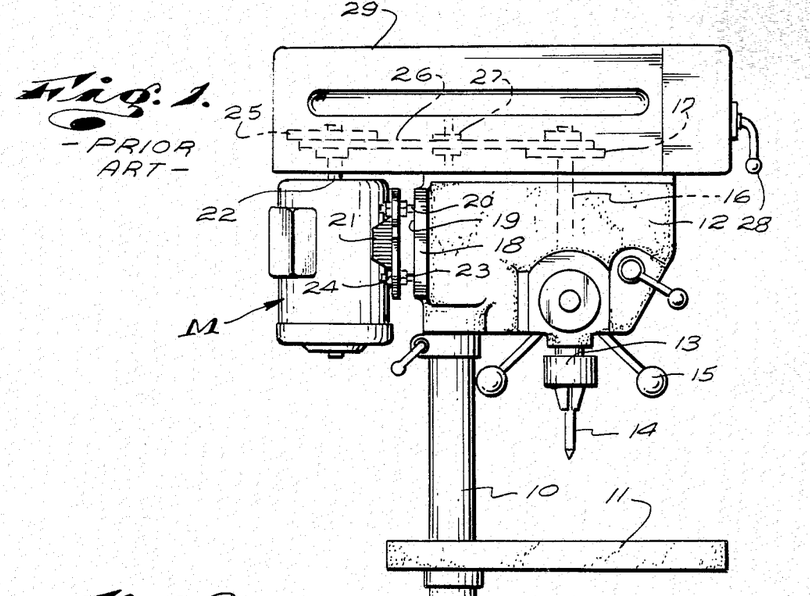
FIG. 1 is a side elevational view of a drill press of the prior art.

In FIG. 1 of the drawings, I have illustrated a typical drill press structure comprising a vertical column 10, a horizontal work table 11 carried by and projecting laterally from one side of the column 10, below the upper end thereof, and a head unit 12 at the upper end of the column, projecting from said one side thereof and occurring in vertical spaced relationship above the table. The head unit 12 carries a vertically shiftable spindle 13 which depends from the head unit and which carries a chuck 14. The chuck 14 carries a vertical depending tool, such as a drill bit 15. The spindle 13 is driven vertically relative to the head unit and the table by a suitable drive means (not shown) within the unit and a related manually engageable lever wheel or unit at one side of the head unit. The head unit 12 further includes a vertical, upwardly projecting driven shaft 16 aligned with the spindle 13 on which a multi-sheave/multi-diameter output pulley wheel 17 is drivingly engaged.

The head unit 12 next includes a motor mounting pad 18. The mounting pad 18 occurs at the side of the column opposite from that side of the column from which the head unit 12 and table 10 project. For the purpose of this disclosure, the head unit and table will be said to project forwardly from the column 10 and the mounting pad will be said to be at the rear side of the column, thus defining the structure with front and rear ends and/or portions relative to which all of the elements and parts of the drill press and of my attachment can and will be related, as circumstances require.

The motor mounting pad 18 is a substantially rectangular vertically extending pad with a substantially flat, rearwardly disposed face 19. The pad 18 carries four standard threaded studs 20, in a fixed predetermined rectangular pattern. The studs 20 project rearwardly from the face 19 of the pad 18. The face 19 of the pad is substantially the same in plan configuration as the support engaging or mounting face of a standard N.E.M.A. No. 56 motor mounting frame and the stud pattern is the same as the fastener opening pattern in the motor mounting frame.

In the case illustrated, the head unit 12 is shown as a cast metal part and the pad 18 is an integral part thereof. In practice, the head unit 12 can be fabricated of a number of parts, in which case the pad 18 is but one of the parts thereof.

The drill press or head unit 12 thereof next includes a standard electric drive motor M, such as an N.E.M.A. #56 mounting frame motor having a standard mounting frame 21. The motor M is positioned at the rear side of the column 10 with its drive shaft 22 projecting upwardly in spaced parallel relationship with the shaft 16, its mounting frame 21 at its forward side and opposing the pad 18 and with the studs 20 of the pad 18 engaged through the fastener openings of the frame 21. The motor is mounted in fixed fore and aft position on the studs 20 and relative to the pad 18 by front and rear stop nuts 23 and lock nuts 24 on the studs. The nuts engage related front and rear surfaces of the frame 21.

The drive shaft 22 of the motor M drivingly carries a multi-diameter input pulley wheel 25. The pulley wheel 25 occurs in rearward spaced relationship from the wheel 17 on the shaft 16 and on a common horizontal plane therewith. A drive belt 26 is engaged with and between the wheels 17 and 25 and in accordance with common practice, is selectively engaged with related pairs of sheaves on the wheels to attain a selected drive ratio between the shafts 16 and 22.

To effect tensioning of the belt 26, an idler pulley wheel 27 is provided to engage the belt 26 between the wheels 17 and 25. The wheel 27 is movable into and out of pressure running engagement with the belt 26 by means of a manually engageable crank 28 at the forward end of the head unit 12 to tension the belt so that it establishes driving engagement with the wheels 17 and 25 or to loosen it to an extent that it can be moved into and out of engagement between and with related pairs of sheaves of the wheels 17 and 25, as circumstances require.

The several pulley wheels 17, 25 and 27 and the belt 26 are typically positioned within a protective housing 29 at the top of the unit 12. The housing 29 is removable from the unit 12 or otherwise provides convenient access to the wheels and belt, when circumstances require.

The motor M is mounted on the studs 20 with its frame 21 in spaced relationship from the pad 18 to properly align the shafts 16 and 22 and to adjust tensioning of the belt 26 for most effective operation of the idler wheel 27. Such mounting of the motor M on the studs 20 is effected by adjustment of the forward stop nuts 23 on the studs and subsequent tightening of the rear lock nuts 24 thereon.

The drill press structure illustrated and described above is typical of many different makes and models of drill presses with which my new attachment can be advantageously related. It is to be understood and believed to be apparent that the details of design and construction of the drill press can vary widely without in any way affecting my invention and that a drill press is but one of many different kinds of motor driven machines with which my attachment can be related.

In the drawings, I have elected to show the multi-sheave/multi-diameter pulley wheels including or provided with three sheaves of different diameter. It will be apparent that in practice, multi-sheave pulley wheels having a greater or lesser number of sheaves can be employed, as desired or as circumstances require.

The motor M is, in accordance with common practice, a constant speed industrial grade prime mover motor for power machines and/or tools. The motor can, for example, be designed to operate at 1750 RPM.

The belt and pulley drive that I have illustrated is a three speed drive and, for example, can be adjusted and set to drive the shaft 16 and spindle 13 at 875 RPM, 1750 RPM, or 3,450 RPM, as desired or as circumstances require.

Figure 2:
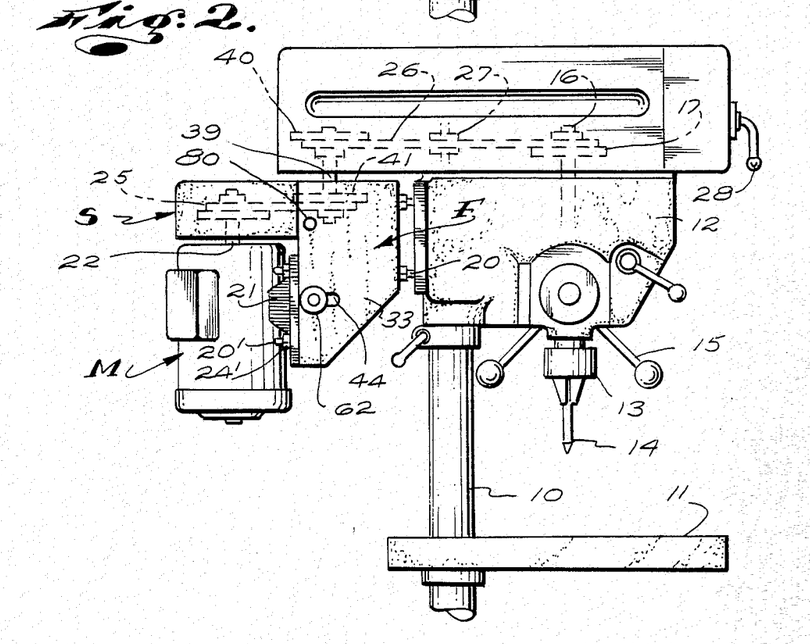
FIG. 2 is a view similar to FIG. 1 with my attachment to the drill press.

The attachment A is shown related to the drill press in FIG. 2 of the drawings. The attachment A is engageable with and between the mounting pad 18 of the head unit 12 and the mounting frame 21 of the motor M and operates to triple the number of selected operating speeds of the drill press. That is, it is such that it increases the number of speeds from three to nine.

In the example given and in one preferred carrying out of my invention, the nine speeds afforded by my attachment range from 288 RPM to 10,350 RPM.

The attachment A first includes a frame part F. The frame part F is preferably a unitary cast metal part, the details of which are clearly illustrated in FIGS. 6 through 9 of the drawings.

The part F has a rearwardly opening box-like upper portion with a flat vertical front wall 30, vertically spaced horizontal top and bottom walls 31 and 32 and vertical side walls 33.

The front wall 30 is substantially the same in plan configuration as the plan configuration of the mounting frame 21 on the motor M and/or the mounting pad 18 of the head unit 12 and has four motor mounting stud or fastener receiving openings 34 therein, which studs occur in the same pattern as the standard stud fastener opening pattern in the frame 21 of the motor.

The top and bottom walls 31 and 32 of the part F have vertically aligned upper and lower bearing receiving seat openings 35 and 36. The openings 35 and 36 occur at the rear portion of the part F intermediate the side walls 33 thereof. The rearward and lateral placement of the vertical axis of the openings 35 and 36 corresponds and/or is the same as the rearward and lateral placement or relationship of the vertical axis of the drive shaft of the motor M, relative to the mounting frame of the standard motor M.

The seat openings 35 and 36 are shown defined by upwardly and downwardly projecting cylindrical sleeve-like bosses formed on the top and bottom walls of the part F.

Figure 3:
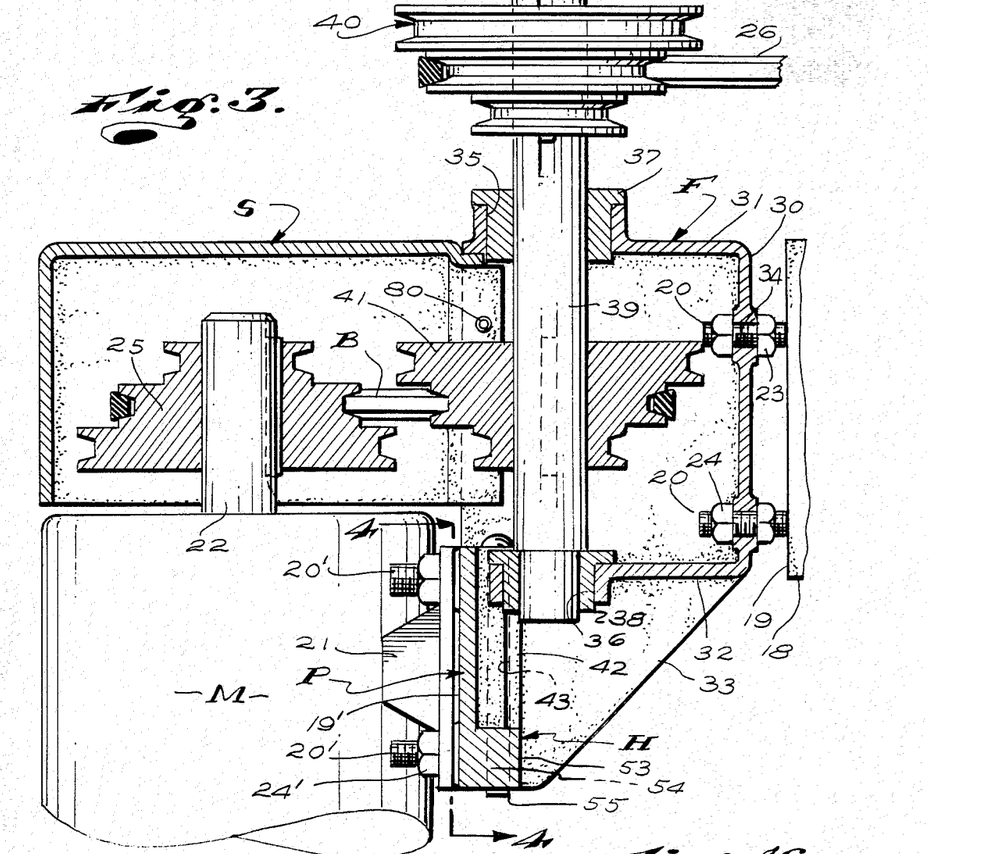
FIG. 3 is an enlarged cross-sectional view of my attachment.

Upper and lower annular anti-friction bearings 37 and 38 are set in the seat openings and the bearings rotatably carry an elongate vertical counter shaft, as clearly shown in FIG. 3 of the drawings.

The shaft 39 has an upper portion projecting freely upwardly from the top of the part F on which a multi-diameter output pulley wheel 40 is drivingly engaged. The wheel 40 is preferably keyed to the shaft 39 and is similar to the drive wheel 25. The wheel 40 occupies space and perfroms the original function of the wheel 25 on the drive shaft of the motor M. In practice, the wheel 40 can be the wheel 25 removed from the drive shaft 22 of the motor and engaged on the shaft 39.

The shaft 35 has a central portion between the top and bottom walls 31 and 32 and between the side walls 33 of the part F. A multi-diameter input pulley wheel 41 is drivingly engaged on the central portion of the shaft 39. The wheel 41 is preferably keyed to the shaft 39 and occurs within the confines of the upper rearwardly opening box-like portion of the part F.

When relating my attachment to the drill press, the motor M of the drill press is disengaged from the drill press and is moved rearwardly and downwardly relative thereto. The part F is then arranged with its front wall 30 in close opposing relationship with the motor mounting pad 18 of the head unit 12 of the drill press, with the mounting studs 20 of the pad 18 engaged in and through the openings 34 in the wall 30. The part F is oriented, positioned and set in desired fixed position relative to the pad 18 and on the studs 20 by normal adjustment of the front and rear stop and lock nuts 23 and 24 on the studs 20, in the same manner that the motor M had been oriented and set on the studs 20 (see FIG. 3 of the drawings).

In addition to the foregoing, the side walls 33 of the part F have lower depending plate or flange-like portions which depend below the bottom wall 32 of the part F and which serve to pivotally support and carry a motor mounting plate P. The lower flange-like portion of one side wall is formed with a laterally inwardly projecting protruberance 42 with a vertical hinge pin opening 43 and the lower flange-like portion of the opposite side wall 33 is formed with an elongate horizontal fastener shank receiving slot opening 44.

With the structure thus far described and as clearly illustrated in the drawings, when my attachment is related to the drill press, the part F, with its related shaft 39 and pulley wheels 40 and 41, occupies the position first or originally occupied by the motor M and wheel 25.

The above referred to motor mounting plate P is shown separately and in detail in FIGS. 9 through 15 of the drawings. The plate P is a separate, unitary cast metal part similar in size and shape with the motor mounting pad 18 of the head unit 12 of the drill press and, like the pad 18, has a substantially flat rearwardly disposed rear surface 19' and a vertical front side or surface 50. The plate P, like the pad 18, is provided with and carries four elongate rearwardly projecting motor mounting studs 20' on which lock nuts 24' are engaged. The studs 20' occur in the same standard pattern as the studs 20.

In practice, if necessary or desired, stop nuts, such as the stop nuts 23 on the studs 20, can be engaged on the studs 20'.

The plate P is rectangular in plan configuration, is arranged between the lower flange-like portions of the side walls 33 of the part F with its rear surface 19' substantially coincidental with the rear vertical plane of the part F and with its opposite vertical sides 51 and 52 in opposed working clearance with related inside surfaces of the side walls 33.

The plate P is formed with a pair of vertically spaced forwardly projecting protruberances 53 with vertical hinge pin receiving openings 54 adjacent one side thereof. The protruberances 53 occur above and below the protruberance 42 on the part F with the several openings 43 and 54 in alignment. A hinge pin 55 is engaged in and through the openings 43 and 54 and pivotally mount the plate P on the part F (see FIGS. 3, 4 and 5 of the drawings).

Figure 4:
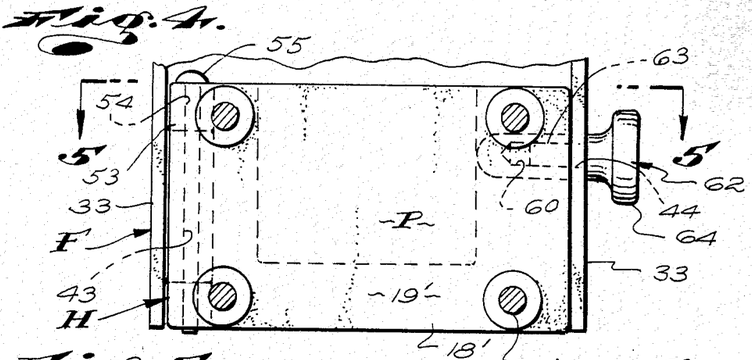
FIG. 4 is a view taken substantially as indicated by line 4—4 on FIG. 3.
Figure 5:
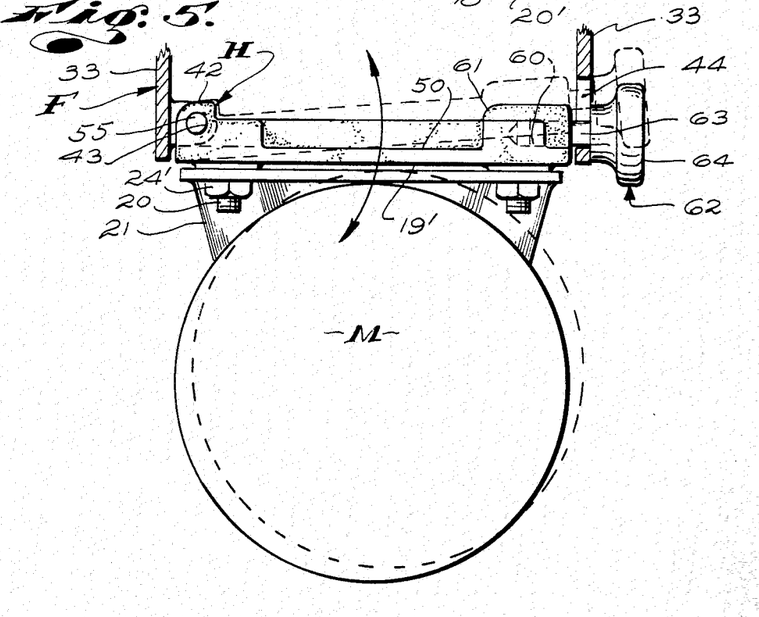
FIG. 5 is a view taken substantially as indicated by line 5—5 on FIG. 4.
Figures 6, 7:
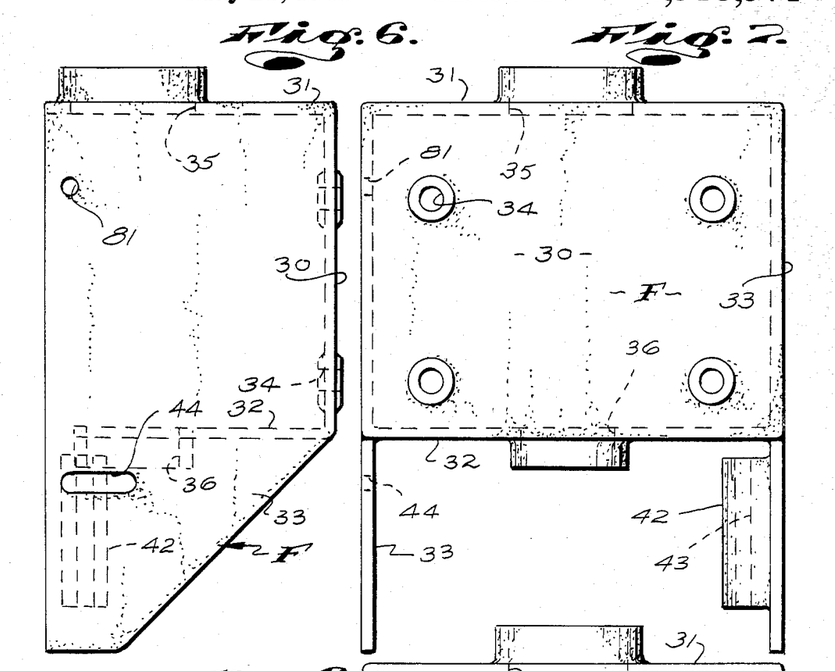
FIG. 6 is a side view of a frame part.
FIG. 7 is a front view of the frame part.
Figures 8, 9:
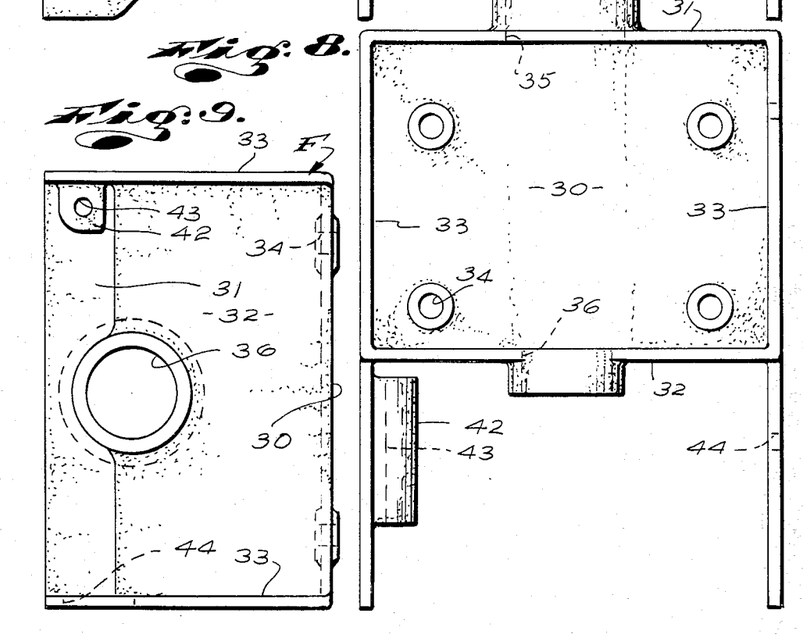
FIG. 8 is a back view of the frame part.
FIG. 9 is a bottom view of the frame part.
Figures 10, 11:
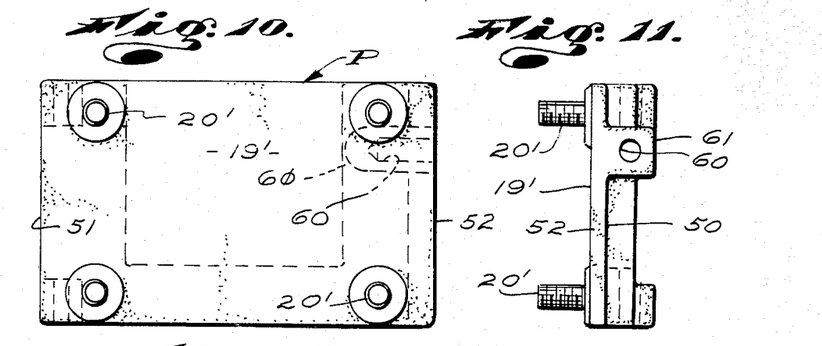
FIG. 10 is a rear view of a mounting plate.
FIG. 11 is a view of one side of the mounting plate.
Figures 12, 13, 14:
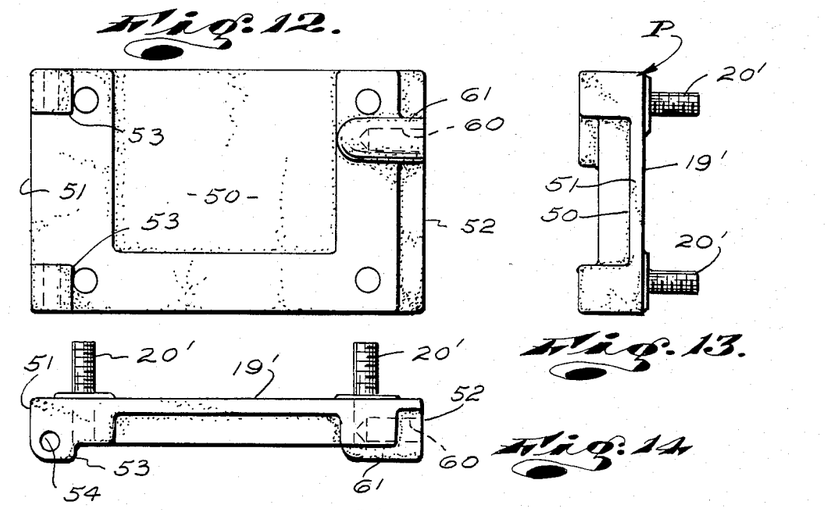
FIG. 12 is a front view of the mounting plate.
FIG. 13 is a view of the other side of the mounting plate.
FIG. 14 is a top view of the mounting plate.
Figure 15:
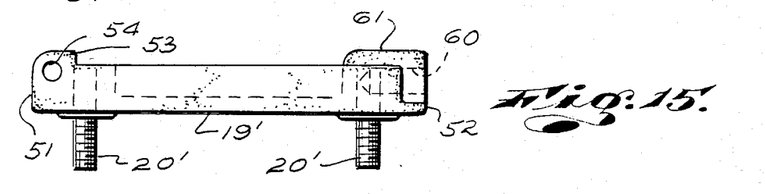
FIG. 15 is a bottom view of the mounting plate.

The protruberances 42 and 53 and the pin 55 establish a hinge means H. In practice, the hinge means H can vary widely in form and construction without in any way affecting or departing from the broader aspects and spirit of my invention.

The plate P is next provided with or includes an elongate horizontal laterally outwardly opening threaded opening 60 at its side opposite the hinge means H. The opening 60 is aligned with the horizontal fastener shank receiving slot 44 in said other side wall 33 of the frame part F. The opening 60 can be and is shown established in a rearwardly projecting protruberance 61 at the rear surface of the plate P.

The attachment next includes a manually operable screw clamp 62 with a threaded shank 63 engaged through the slot 44 and into the opening 60 and a manually engageable head or handle 64 at the outer end of the shank, accessible at the exterior of the frame part F and shiftable into and out of tight clamped engagement on and with the outside surface of its related side wall 33.

With the structure described above and as clearly shown in FIG. 5 of the drawings, upon loosening and tightening of the screw clamp 62, the plate P can be pivoted forwardly and rearwarldy and can be set in desired fixed fore and aft position in and relative to the part F and relative to the axis of the shaft 39, as desired and as circumstances require.

The motor M with the wheel 25 engaged on its shaft 22 is engaged adjacent the rear surface 19' of the plate P with the studs 20' engaged in and through the fastener openings in its mounting frame 21 and with the lock nuts 24' on the studs advanced forwardly to engage and hold the motor frame securely mounted on the plate P.

The drive pulley wheel 25 on the shaft 22 of the motor M occurs rearward of and is aligned with the input pulley wheel 41 on the shaft 39 and a drive belt B is engaged with and between related sheaves of the wheels 25 and 41, as clearly shown in FIG. 3 of the drawings.

It is to be noted that by operation of the screw clamp 62 and pivoting of the plate P, the belt B can be made slack to effect movement of the belt between related pairs of sheaves of the wheels 25 and 41 and to tension the belt to establish suitable driving engagement with the noted wheels, as desired and as circumstances require.

With the attachment structure described and illustrated, it will be apparent that the belt 26 between the shafts 39 and 16 can be adjusted to attain different ratios of speed between the shafts 39 and 16 in accordance with normal use and practice of the drill press and that the belt B between the countershaft 29 and the motorshaft 22 can be adjusted to attain different ratios of speed between the shafts 39 and 22 by operation of the attachment in the manner described above, thus compounding the range of speed adjustment or the number of different speed ratios between the motorshaft 22 and the shaft 16 of the drill press.

In practice, the pulley wheels of the related pairs of belt coupled wheels preferably include like numbers of sheaves. However, the number of sheaves each of the pairs of wheels includes need not be the same. For example, the wheels of the pair of wheels 25 and 41 can include two, three, four or more sheaves, as desired or as circumstances require and the wheels 40 and 17 can include the same or any different number of sheaves, without departing from the broader aspects and spirit of my invention.

With the attachment structure that I provide, the countershaft 39 is on an axis which is spaced rearward of the front wall 30 of the frame F the same distance that the shaft 22 of the motor is spaced from the forward face of the mounting frame 21 of the motor, whereby the attachment can be advantageously engaged with the motor mounting pad 18 of the head unit 12 of the drill press or with the similar motor mounting pad of any other machine. Further, the shaft 39 can be and is preferably positioned rearwardly in the frame part so that it is in close relationship to the front plane of the mounting frame 21 on the motor M, whereby the motor M is moved and/or positioned rearwardly from its original position a distance less than the major diametric extent and a distance only slightly greater than the major radial extent of the motor when the attachment that I provide is engaged with and between the motor and the head unit of the drill press. Thus, as regards the fore and aft dimensions of the construction, the attachment structure is compact and is such that the motor is not displaced rearwardly from its original position and relative to the drill press an extent or distance which is excessive and such that it can be accommodated in the motor work space provided in most motor powered machines with which the attachment might be related.

Further, the vertical extent of the attachment need be no greater than is necessary to accommodate and provide vertical working clearances for the drive and driven pulley wheels 25 and 41 and need not be greater than twice the vertical extent of the motor mounting pad 18 and/or motor mounting frame 21. Thus, the attachment structure is vertically compact and vertical or axial displacement of the motor, from its original vertical position, is only equal to about the vertical extent of the motor mounting pad 18 and is substantially less than the vertical or axial motor working clearance provided in motor powered machines with which my attachment structure might be related.

During development of my attachment structure, special attention was given to the motor mounting and working clearances provided in the most common and widely used industrial quality motor driven machines with which my attachment structure might be related and the attachment was designed so that it can be advantageously related to all of those machines without any major alteration or rebuilding thereof.

Figure 16:
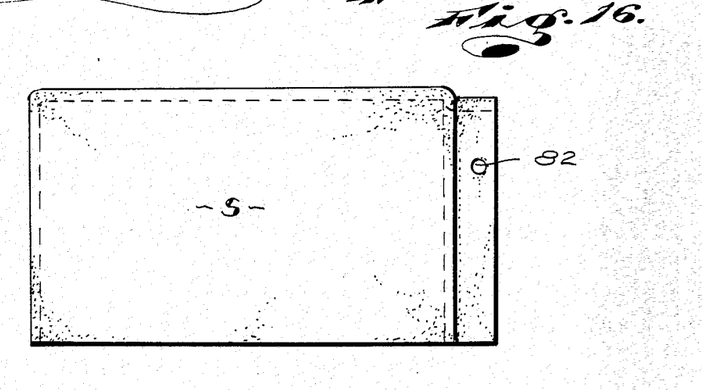
FIG. 16 is a side view of a guard part.

Finally, in addition to the foregoing and to meet certain safety codes and the like, my attachment structure includes an elongate, horizontal, forwardly and downwardly opening shell-like protective shield S. The shield S overlies the upper end of the motor M and encloses the pulley wheel 25. The shield S has a front end which is slidably engaged in the open rear of the upper portion of the frame part F, as clearly shown in FIGS. 2, 3 and 16 of the drawings. The shield S is releasably held engaged in and with the part F by manually accessible and operable screw fasteners 80 engaged in registering openings 81 and 82 in the part F and the shield.

Having described only one typical preferred form and application of my attachment, I do not wish to be limited to the specific details herein set forth but wish to reserve to myself any modifications and/or variations that might appear to those skilled in the art and which fall within the scope of the following claims:

Having escribed my invention, I claim:

1. A belt drive attachment for motor driven machines comprising a vertical frame with top and bottom ends, spaced front and rear ends and spaced sides, a substantially flat mounting wall at the upper forward portion of the frame to engage and be fastened to a motor mounting pad on a related machine, bearing means within the frame, an elongate countershaft rotatably carried by the bearing means and having a portion projecting from the frame and a portion within the frame, a mounting plate at the lower rear portion of the frame to releasably cooperatively engage a motor mounting frame of a related motor, hinge means pivotally connect the plate to the frame for pivotal movement of said plate and a related motor relative thereto, clamp means engaged with and between the frame and the plate and releasably hold the plate in fixed pivotal position, a multi-diameter/multi-sheave input pulley wheel is drivingly engaged on the portion of the shaft within the frame, a drive belt is engaged about and between the input pulley wheel and a complimentary multi-diameter/multi-sheave pulley wheel on the drive shaft of a related motor mounted on the plate and a multi-diameter/multi-sheave output pulley wheel is drivingly engaged on the portion of the countershaft projecting from the frame and is engageable with a drive belt engaged with and extending from a multi-diameter/multi-sheave driven pulley wheel on a driven shaft on a related machine spaced from the output pulley wheel.

2. The belt drive attachment set forth in claim 1 wherein the said front wall and the plate have surfaces and fastener parts to cooperatively engage with complimentary motor mounting pads and motor mounting frames of the related machine and motor.

3. The belt drive attachment set forth in claim 1 wherein said bearing means include a pair of bearings spaced axially of the shaft at opposite ends of the input pulley wheel and mounted in the frame.

4. The belt drive attachment set forth in claim 2 wherein said bearing means include a pair of bearings spaced axially of the shaft at opposite ends of the input pulley wheel and mounted in the frame.

5. The belt drive attachment set forth in claim 1 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank.

6. The belt drive attachment set forth in claim 1 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank, said front wall and the plate have surfaces and fastener parts to cooperatively engage with complimentary motor mounting pads and motor mounting frames of the related machine and motor.

7. The belt drive attachment set forth in claim 1 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank, said bearing means include a pair of bearings spaced axially of the shaft at opposite ends of the input pulley wheel and mounted in the frame.

8. The belt drive attachment set forth in claim 1 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank.

9. A belt drive attachment for motor driven machines comprising a vertical frame with top and bottom ends, spaced front and rear ends and spaced sides, a substantially flat mounting wall at the upper forward portion of the frame to engage and be fastened to a motor mounting pad on a related machine, bearing means within the frame, an elongate countershaft rotatably carried by the bearing means and having a portion projecting from the frame and a portion within the frame, a mounting plate at the lower rear portion of the frame to releasably cooperatively engage a motor mounting mounting frame of a related motor, hinge means pivotally connect the plate to the frame for pivotal movement of said plate and a related motor relative thereto, clamp means engaged with and between the frame and the plate and releasably hold the plate in fixed pivotal position, a multi-diameter/multi-sheave input pulley wheel is drivingly engaged on the portion of the shaft within the frame, a drive belt is engaged about and between the input pulley wheel and a complimentary multi-diameter/multi-sheave pulley wheel on the drive shaft of a related motor mounted on the plate and a multi-diameter/multi-sheave output pulley wheel is drivingly engaged on the portion of the countershaft projecting from the frame and is engageable with a drive belt engaged with and extending from a multi-diameter/multi-sheave driven pulley wheel on a driven shaft on a related machine spaced from the output pulley wheel, said frame is a unitary cast metal part including said mounting wall at its upper forward position, laterally spaced side walls, a top wall and a lower wall spaced below the top wall, said plate is a cast metal part substantially corresponding in plan configuration with said mounting wall.

10. The belt drive attachment set forth in claim 9 wherein the said front wall and the plate have surfaces and fastener parts to cooperatively engage with complimentary motor mounting pads and motor mounting frames of the related machine and motor.

11. The belt drive attachment set forth in claim 9 wherein said bearing means include a pair of bearings spaced axially of the shaft at opposite ends of the input pulley wheel and mounted in the frame.

12. The belt drive attachment set forth in claim 10 wherein said bearing means include a pair of bearings spaced axially of the shaft at opposite ends of the input pulley wheel and mounted in the frame.

13. The belt drive attachment set forth in claim 9 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank.

14. The belt drive attachment set forth in claim 13 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank, said front wall and the plate have surfaces and fastener parts to cooperatively engage with complimentary motor mounting pads and motor mounting frames of the related machine and motor.

15. The belt drive attachment set forth in claim 13 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank, said bearing means include a pair of bearings spaced axially of the shaft at opposite ends of the input pulley wheel and mounted in the frame.

16. The belt drive attachment set forth in claim 13 wherein the clamp means includes a slot opening in a side of the frame, a threaded shank engaged through said opening and into the plate and a manually engageable head on the shank outward of the side of the frame and movable into and out of clamping engagement with said side of the frame upon rotation of said shank.

* * * * *